US008606606B2

(12) United States Patent
Andersen et al.

(10) Patent No.: US 8,606,606 B2
(45) Date of Patent: Dec. 10, 2013

(54) SYSTEM AND METHOD FOR TRANSLATION PROCESSING

(75) Inventors: Mark V. Andersen, Lexington, MA (US); Hernando Torres-Rocca, Newtonville, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 1181 days.

(21) Appl. No.: 11/648,991

(22) Filed: Jan. 3, 2007

(65) Prior Publication Data

US 2008/0162112 A1      Jul. 3, 2008

(51) Int. Cl.
*G06Q 40/00* (2012.01)

(52) U.S. Cl.
USPC .......................... 705/7.11; 705/7.42

(58) Field of Classification Search
USPC ............................ 705/9, 7.11–7.42
See application file for complete search history.

(56) References Cited

U.S. PATENT DOCUMENTS

| | | | |
|---|---|---|---|
| 5,583,761 A * | 12/1996 | Chou | 715/201 |
| 5,644,775 A * | 7/1997 | Thompson et al. | 704/7 |
| 5,974,372 A * | 10/1999 | Barnes et al. | 704/8 |
| 6,469,713 B2 * | 10/2002 | Hetherington et al. | 715/740 |
| 6,526,426 B1 | 2/2003 | Lakritz | |
| 6,980,953 B1 | 12/2005 | Kanevsky et al. | |
| 7,110,938 B1 | 9/2006 | Cheng et al. | |
| 7,184,539 B2 | 2/2007 | Colson et al. | |
| 7,653,529 B2 * | 1/2010 | Litster et al. | 704/8 |
| 2003/0125928 A1 | 7/2003 | Lee et al. | |
| 2003/0176995 A1 | 9/2003 | Sukehiro | |
| 2005/0065836 A1 | 3/2005 | Tanaka et al. | |
| 2005/0075858 A1 | 4/2005 | Pournasseh et al. | |
| 2005/0086044 A1 | 4/2005 | Hess et al. | |
| 2007/0233547 A1 * | 10/2007 | Younger et al. | 705/9 |

FOREIGN PATENT DOCUMENTS

EP        0366142        10/1989

OTHER PUBLICATIONS

Brockman, "SDL Trados TM Server," An SDL International White Paper, Jul. 2006, 15 pages.

* cited by examiner

*Primary Examiner* — Thomas Dixon
*Assistant Examiner* — Benjamin S Fields
(74) *Attorney, Agent, or Firm* — Jessica Costa (57) ABSTRACT

System and method for tracking and processing of text translations for online use. The adding or editing of a text element for a primary language site or a primary language promotional email automatically generates a potential translation task. Potential translation tasks are reviewed and either deleted if no translation is required or organized into groups of related translation items and submitted along with language and schedule information for translation of the primary language text into other languages for use on other language versions of the primary language site or emails. Submission of a translation group generates an automatic notification of pending translation work to the affected translators. In performing translations, the translator first selects a task group and then translates the individual tasks in the group.

16 Claims, 7 Drawing Sheets

SYSTEM AND METHOD FOR TRANSLATION PROCESSING

FIELD OF THE INVENTION

This invention relates to the processing and management of language translation tasks.

BACKGROUND OF THE INVENTION

For international enterprises that provide customer websites in many different languages, the process of keeping all of the enterprise's sites updated with timely and accurate translations can be challenging and time consuming. Many companies with a multinational customer base will operate a primary site, with text in the language of the country where the company is located, and several other sites in other languages that contain translated versions of the contents of the primary site. Information about new company products or services, new features for existing products or services, or new promotional offers and marketing campaigns needs to be translated and incorporated in a timely manner, as appropriate, into the company's various sites.

In addition to the usual issues encountered in any translation effort, such as dealing with variations in sentence structure, grammar, vocabulary, gender, and cultural differences, several additional factors come into play when trying to maintain timely, relevant, and accurate translations across multiple different language sites in a web environment. For example, a significant number of company employees from different functional areas or departments within the company may be involved in contributing or editing the text content of the sites, site content may change rapidly, some content may be applicable to all international sites while other content may be applicable to only some countries, and so forth. Similar problems are encountered in connection with email content if the company also conducts international email marketing campaigns in support of its product offerings.

Further contributing to the challenge of performing and maintaining multiple language translations in a web environment is the fact that a typical web page is rendered from many relatively small elements having text content combined with the markup language instructions controlling the positioning and rendering of the text by the browser of the user's computer. Providing translators with individual markup language text elements for translation is known in the art, but a translator presented with a short amount of text out of context may not understand or appreciate the overall use of the text within the larger page, possibly resulting in an incorrect translation. Also, the various ways in which text may be encountered are typically handled by different or independent techniques, potentially resulting in delays and inconsistencies. For example, text appearing in marketing emails, text appearing in text elements on the web site, and text embedded in images may all be handled by a different process and with different tools.

Known prior art techniques for managing translations do not provide a comprehensive translation workflow system that fully addresses the issues arising from maintaining multiple similar translated websites. Commercially available tools for translation project workflow are known in the art, but these tools typically are not well adapted to the translation of web sites and emails into multiple languages. They often contemplate dealing with the translation of entire documents or relative large blocks of text, not the relatively small markup language elements typically encountered in frequently updated web pages where a large number of frequently changing products and services are marketed. Prior art tools also typically anticipate a centralized management and communication approach that does not fit well with a company employing a diversified web content editing process where content editing capability and authority is distributed among multiple organizations.

There is, therefore, a need for computer-implemented systems and methods that provide multi-language web site translation task scheduling and management.

SUMMARY

The present invention is directed at satisfying the need for a system and method for facilitating translation workflow.

In accordance with one aspect of the invention, automatically generated potential translation items are reviewed and either deleted if no translation is required or organized into groups of related translation items and submitted along with language and schedule information for translation of the primary language text into other languages for use on other language versions of the primary language website or emails. Translators first select a translation group and then translate the individual translation items in the group.

It is an advantage of the invention that translation items are presented and handled in a standard, integrated manner.

It is another advantage that related translation items are grouped for efficient translation processing.

It is yet another advantage that tracking, reporting and analysis of the processing of translation items and groups is facilitated, reducing the likelihood of mishandling of text content and translations.

These and other objects, features and advantages of the invention will be better understood with reference to the accompanying drawings, description and claims.

DETAILED DESCRIPTION

The following discussion is presented in the context of a family of related web sites operated by an online printing services provider offering a broad variety of user-customizable printed products or services for businesses and consumers, such as business cards, postcards, brochures, invitations, calendars, and the like. The printing services provider generally offers substantially similar types of products in all worldwide, therefore the website product descriptions and other site content is typically substantially similar across all language sites operated by the company.

The primary language of the employees of the site operator in this embodiment is United States English and the primary source language for web site content and for marketing and promotional emails is United States English. Most of the text content for the operator's sites worldwide is, therefore, written originally in U.S. English for incorporation into the operator's primary U.S. English site. Translators employed by the service provider translate the U.S. English text into French, German, Japanese, and other languages and incorporate the translated text into the site content of the other language websites operated by the printing services provider. The content and appearance of the related company sites in other languages is controlled and maintained so as to all be substantially similar in look and feel to the U.S. English site, except to the extent that variations may inherently result from or be required by the replacement of English text with translated text. It will be understood that this printing services example is merely for illustration and the invention is not in any way limited to this type of enterprise or to the use of English as the primary language.

Figure 1:
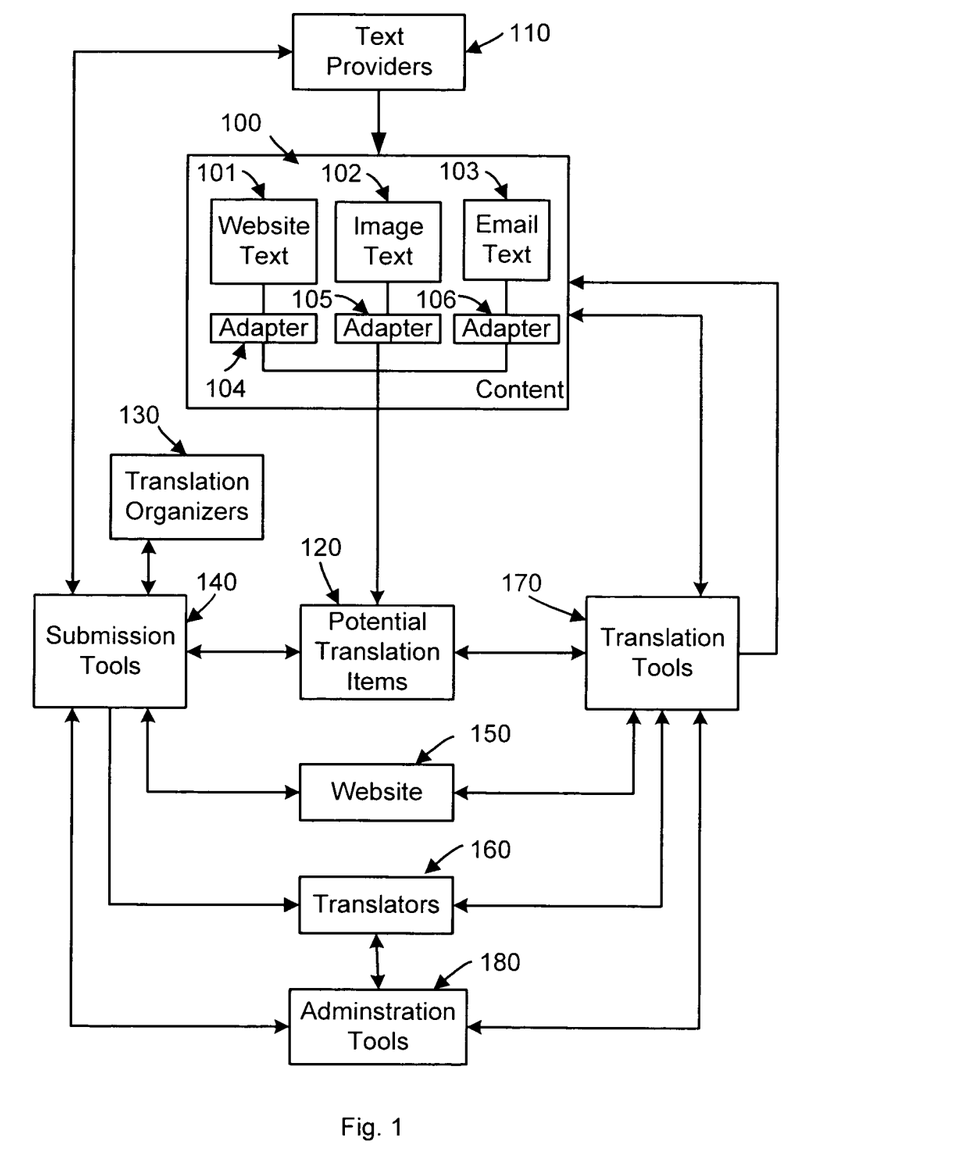
FIG. 1 shows an illustrative embodiment of a system with which the invention may be employed.
Figure 5:
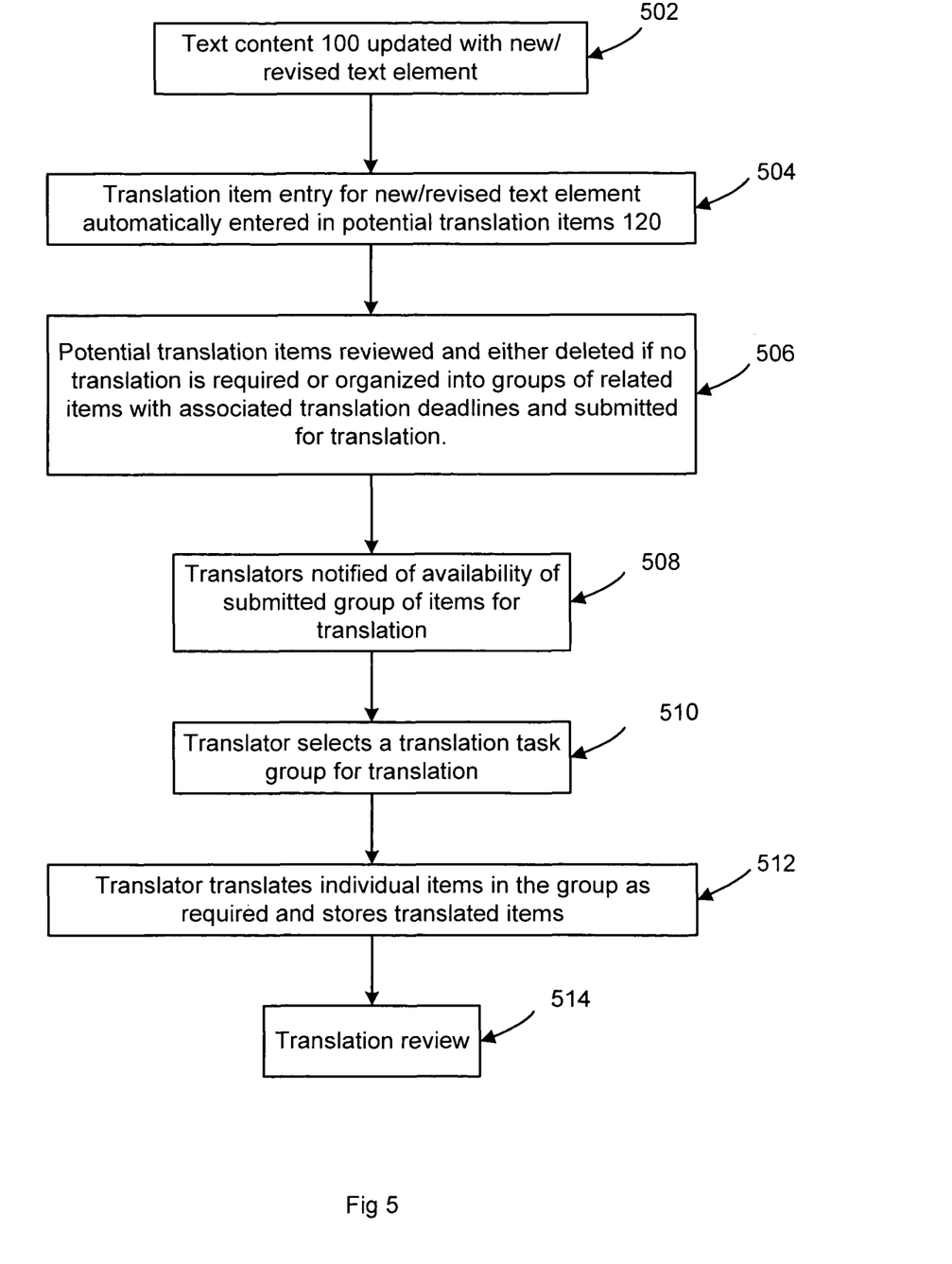
FIG. 5 is a flow chart depicting an embodiment of a method of translation items processing.

Referring to FIGS. 1 and 5, an overview of one embodiment of a translation workflow system will be discussed. As used herein, the terms "text" and "text content" encompass all types of characters including, but not limited to, letters, numerals, punctuation marks, symbols, markup language tags, and the like. A "text element" is any text entry that a text provider has chosen to create and treat as a separate and discrete item of text to be separately identified and tracked in the content management system employed by the site operator. Some text elements could be relatively large, such as a paragraph, page, or email, while others could be only a phrase, a word, an abbreviation, an acronym, or any string of one or more characters. Each text element, along with its corresponding translated version in other languages, is maintained in a content management system. The design and operation of multi-language content management systems is well known in the art.

Content 100 represents not only a copy of the text content that is currently in active use on the company's sites and in the company's promotional emails to current and prospective customers, but also includes previously used text that has been retained for archival purposes or for possible future reuse and new text that is being created, edited, evaluated, and tested internally in preparation for becoming part of a public company web site at a future date.

Website text 101 represents the text content for each text element that currently appears in any public web page of the company and text content that is being prepared for future site use. While shown in FIG. 1 as a single block, it will be understood that the site operator could, if desired, implement and maintain multiple repositories of website text for different website applications or for use by different internal organizations.

Image text 102 represents those text elements that are embedded into an image that has been prepared by the business for displaying on a site or in an email. Because the text is been incorporated into the image itself, preparation of translated images to make the image suitable for use in other languages involves both translation of the text itself and editing of the image. For example, a page on the site might include a JPEG image of a representative product, for example an example of a business card or postcard. While the basic image of the product can be used on all sites, the text appearing on the product in the image will need to be at least partially modified for use on other language sites. The editing of the image to accomplish the text replacement can be performed by the translator as a part of the translation of the item or performed by another specialist using commercially available photo editing tools, such as Adobe Photoshop.

Email text 103 represents the text components of email messages created to be distributed to existing or prospective customers for informational or promotional purposes. While website text 101, image text 102 and email text 103 are shown in FIG. 1 as three separate content management systems, it will be understood that more or fewer of such systems could be employed. For example, as mentioned above, a site operator might have different types of website text that the operation desires to manage separately or, alternatively, the site operator might choose to implement a single integrated content management system for tracking all text content elements.

Text Providers 110 represents all employees and agents of the business who are engaged from time to time in adding, deleting, and/or editing text elements in text content 100. For example, web programmers, marketing personnel, graphic designers, and quality assurance reviewers may all have a reason to enter, amend, or correct a site text entry. These individuals are collectively referred to herein as text providers. In a large enterprise, text content 100 may be updated frequently and multiple different text providers may be editing text and interacting with text content 100 simultaneously.

At step 502, a text provider adds a new text element or edits an existing text element in text content 100. At step 504, each time a new text element is added or an existing text element is modified in any of the content management systems in text content 100, a translation item entry is automatically generated and stored in a queue of potential translation items 120. In the disclosed embodiment, translation item entries are generated by adapters 104-106, which receive text edit information from website text 101, image text 102, and email text 103, respectively, in the particular output manner and format used by those content management systems. Adapters 104-106 create potential translation items presenting the text edit information in a standard format to facilitate uniform and efficient processing by translation item submitters and translators. Depending on the particular capabilities of the content management systems 101-103, text edit information could either be "pushed" to the appropriate adapter 104-106 by a content management system whenever a text element is added or edited, or alternatively, adapters 104-106 could be designed to "pull" the text edit information from the content management systems by periodically querying for text edit updates. As yet another alternative, the functions of adapters 104-106 could be implemented directly in content management systems 101-103 by adapting those systems to internally generate the appropriately formatted potential translation items in response to text edit operations.

In the disclosed embodiment, each translation item entry includes an automatically generated unique translation item tracking identifier, an indication of the content management system in text content 100 where the text element resides, the unique identifier of the revised text element and its associated web page, at least a portion of the relevant text, the date and time when the text element was first entered in the content management system, the date and time when the text element was most recently amended, and the name or other identifier of the individual who made the text change.

Some of the automatically generated potential translation items will not actually require translation and will not, therefore, need to be forwarded to the translators. Of the items that do require translation, many will be related, such as a similar text change made at multiple locations. Overall translation efficiency and speed is improved by organizing similar translation items into translation groups, or tasks, for processing together as a group by a single translator. Therefore, at step 506, before translation items are made available to translators 160 for translation, the translation items in potential translation items 120 are first reviewed and processed with submission tools 140. Submission tools 140, as will be discussed in more detail below in connection with FIG. 3, allows items that clearly do not require translation to be identified and deleted without requiring translator involvement and allows related translation items to be grouped together into translation groups to facilitate more focused and efficient processing by translators 160.

The logical person to perform the grouping of individual translation items is generally the text provider who made the U.S. text changes in text content 100 and is most familiar with the changes. Therefore, in many cases, the creating of translation items groups with submission tools 140 will often be performed by the same text provider who made the associated text edits. Upon completion of a session of text changes, the text provider can access submission tools 140 to create the groups for submission to translators. In some situations, however, one or more other parties, indicated in FIG. 1 as translation organizers 130, may be involved in creating translation groups on behalf of the text provider. For example, a manager may wish to handle or review task grouping for a novice text provider or a single team member may be assigned the task of grouping translation tasks for a team of text providers working on related text entries.

Translators 160 represents all employees or agents involved in preparing and maintaining translated versions of the content of the primary language site. At step 508, when a translation item group is assembled and forwarded for translation, the appropriate translators 160 are notified that translation work is pending. The notification can be by a popup message or flag, by email, or other means. To perform the translation work, the translator will, as discussed below, access translation tools 170 at step 510 and select a group of translation items. At step 512, the individual translation items in the selected group will be translated as required. Some or all of the translation work of a translator may then be reviewed for accuracy at step 514.

Administration tools 180 provides the tools for the assignment and control of grouping and translation privileges for users of the submission tools 140 and translation tools 170. In the illustrative embodiment discussed herein, four administrative displays are employed. An administrator can navigate among the displays, shown in FIGS. 2A-2D, by means of user-selectable tabs 202, 204, 206 and 208. Persons with administrative privileges can use the administration tools for actions such as identifying users who are text providers in text content 100, establishing the language permissions for individual translators, establishing standard and special purpose translation schedules, and controlling translation deadlines.

Users 210 (FIG. 2A) maintains a list of all text providers 110. The first time a new text provider is detected as editing a text element in text content 100, that person's username is automatically added to users display 200 and flagged for administrator review. A unique user identifier is associated with the user's system username and first and last name. Additional columns with additional identifying or authorization information may be employed, if desired.

Figure 2A:
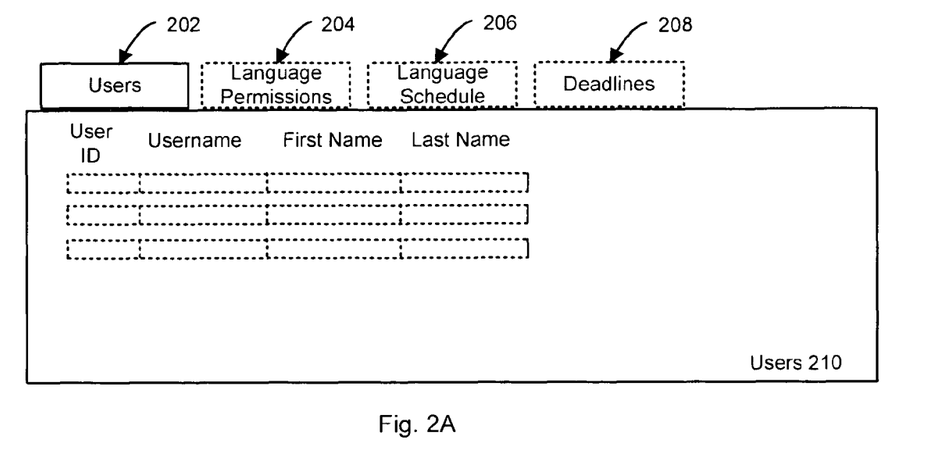
FIGS. 2A-2D depicts an embodiment of displays for translation system administration.
Figure 2B:
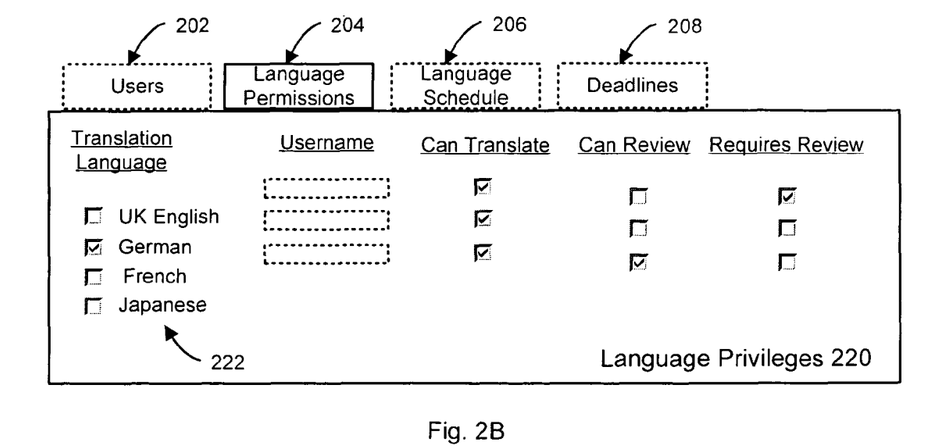
Figure 2C:
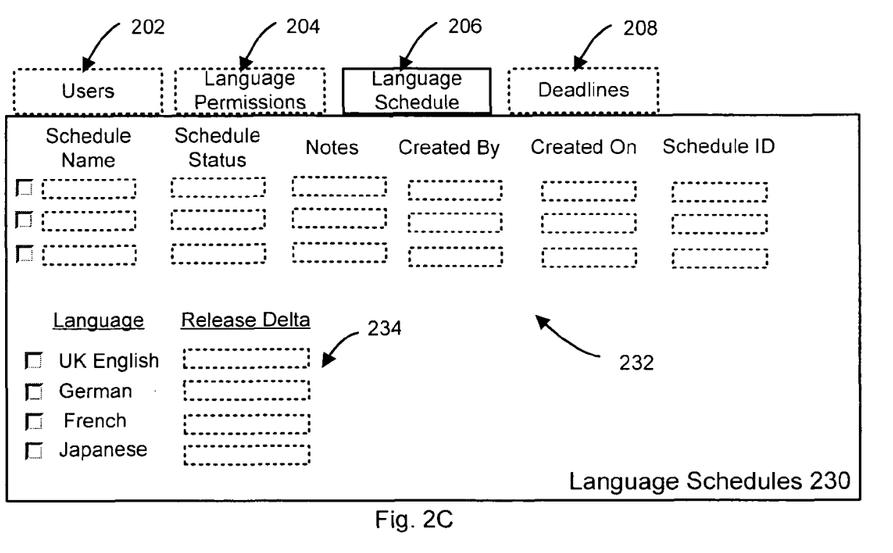

Language Privileges 220 (FIG. 2B) allows a system administrator to review and control the scope of privileges associated with each translation language and each translator. Four languages 222 are shown in FIG. 2B for simplicity of illustration, but a major international enterprise would generally translate its U.S. content into many more languages. Because of variations in spelling and word usage among countries or regions sharing a common language, the site operator further provides for separate specialized translation reviews. For example, because of the various differences in spelling and word usage that exist within English speaking countries, U.S. text items are reviewed for any modifications that are appropriate to bring the U.S. English text into conformity with U.K., Australian, Canadian, and New Zealand English for the company sites that are directed at residents of those countries.

When a translation language 222 is selected, display 220 will display checkmarks beside each translator's username indicating the translation privileges of that translator for that language. For example, if German were the selected translation language, as shown in FIG. 2B, a relatively inexperienced German translator might be authorized to translate, but the translation work will require review by a more senior reviewer before it is released for use on the website. This would be indicated by a checkmark in the "Can Translate" column and the "Requires Review" column for that translator. A more experienced translator might be authorized to translate and submit translations for use without further review, indicated by a checkmark only in the "Can Translate" column. A skilled translator who has the ability to review and approve the translations of others would be indicated by checkmarks in both the "Can Translate" and "Can Review" columns.

In the disclosed embodiment, under normal operating conditions, the site content of all sites is updated substantially at the same time on predetermined dates termed "release dates". The schedule of planned release dates is termed a "release schedule". The company operating the sites may opt to keep all of its different sites highly synchronized by releasing new content on the primary site and on the translated sites simultaneously on the same release date or, alternatively, may choose to release new content in a phased manner such that new content appears first on the primary site with the translated sites being updated with the translated new content at a later release date.

A single translation schedule probably will not meet all of the business needs of the company. Difference in new product introductions, country availability, and type of content require that translation scheduling be adaptable. Language Schedule 230, FIG. 2C, allows an administrator to establish multiple translation schedules 232 for use by the operators of submission tools 140, as will be discussed below. The administrator can assign a descriptive schedule name, a schedule status (active or inactive), and enter any notes regarding schedule use or applicability. For each schedule, the administrator can define a "release delta" 234 for each individual translation language, the release delta being the number of releases between the release of the primary site U.S. content and the schedule for releasing the corresponding translated content on the translated sites. As one example, the administrator could create a schedule specifying that translations of edits made on the U.S. site must appear on the German, French, U.K. and Spanish sites at the next site release following the U.S. release of the content (indicated by release delta=1), while translation of the edits on all other language sites will appear on all other language sites on the second release following the U.S. release (indicated by release delta=2). Any number of different schedules with different translation release deltas could be created and made available for selection by the user of submission tools 140.

Figure 2D:
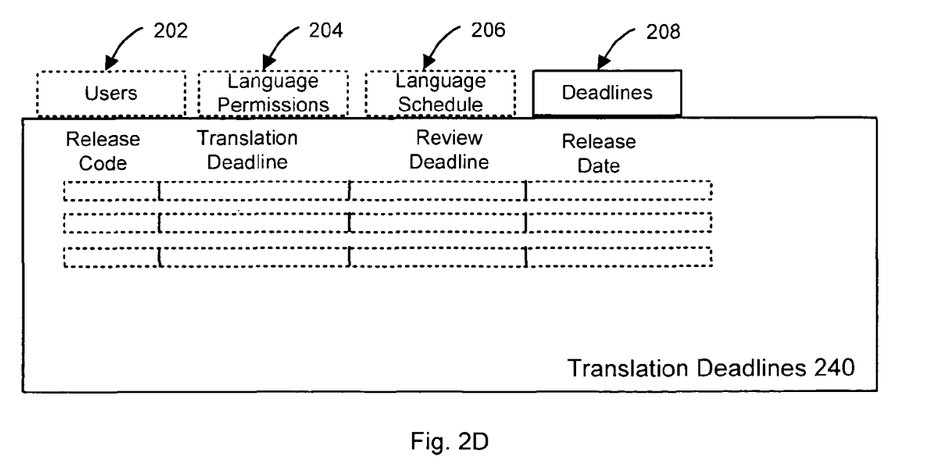

Translation deadlines 240 (FIG. 2D) allows the administrator to specify deadlines by which all translation items for a specific release must be completed and the corresponding deadlines by which all translations requiring review must have been reviewed and approved. The release code column contains the shorthand code, if any, that the site operator has adopted for the releases, for example each release may be assigned a sequential reference number, such as "Release 108" or "Release 7.1". While FIG. 2D depicts an example where a single translation deadline and a single review deadline are employed for each release code, multiple deadline columns could be employed if desired, for example if different types of content being translated for a particular release have different translation deadline requirements.

Figure 3:
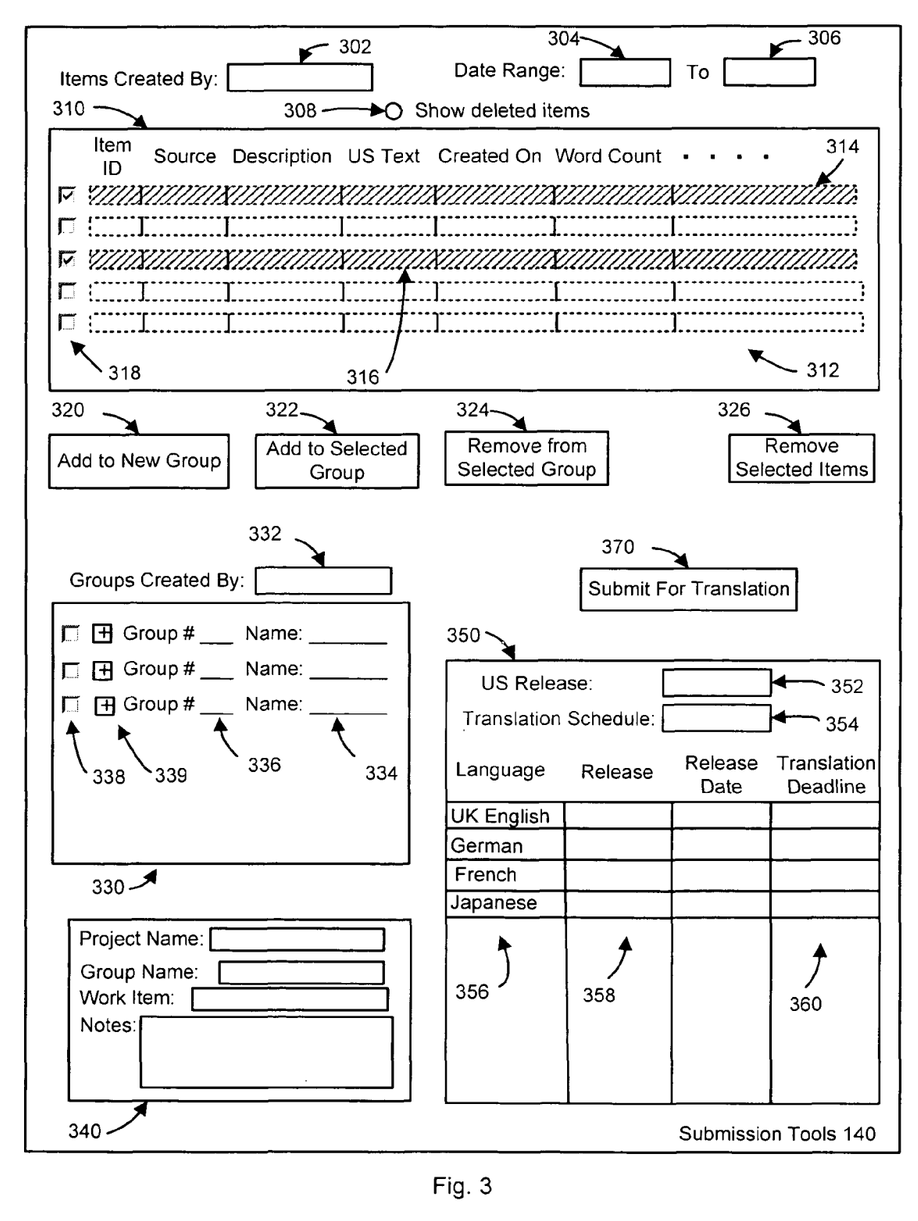
FIG. 3 depicts an embodiment of a display for the creation and submission of translation groups.

Referring now to FIG. 3, an illustrative embodiment of submission tools 140 will be discussed. Submission tools 140 allows individual pending translation items to be reviewed and either discarded if no translation is required or organized into groups of related items for more efficient translation. Drop down menu 302 displays the name of the text provider who made the edits to text content 100 that resulted in the creation of the translation items displayed in items field 310. The operator of tools 140 may select the name of a text provider from among the set of names for whom the operator of tools 140 is authorized to create translation groups. Using calendar menus 304 and 306, the tools 140 operator can enter a beginning and ending date range to limit the items displayed in field 310 to only those translation items created during that specified time period.

Items field 310 contains all translation items that were generated by text edits made by the individual selected in menu 302 during the date range established by menus 304 and 306 and that have not yet been grouped and submitted to translators 160 for translation. For simplicity of illustration, five translation item entries 312 are displayed, though it will be understood that a much larger number of entries could be available for display. Each translation item entry contains an automatically assigned translation item identifier, an indication of the source of the translation item (for example, whether the source of the text item is website text 101, image text 102, or email text 103), a descriptive identifier of the text item that was changed, a brief excerpt of the new U.S. text, the date and time the translation item was created, and the number of words edited in the U.S. text. It will be appreciated that additional or different entries could be incorporated, if desired.

Each translation item in field 310 can be individually selected by the operator of tools 140, for example by checking check box 318 or other means, such as clicking directly on the item entry. In the situation depicted in FIG. 3, items 314 and 316 have been selected. To provide an additional visual indication of the selected state of the items, the background colors of selected items is altered, indicated in FIG. 3 by diagonal lines in selected items 314 and 316. It is a general goal that individual translation items be evaluated and grouped for translation as soon as practical so that the process of translating the changes into the various target languages can be initiated. To help prevent ungrouped translation items from languishing in potential translation items 120 for an excessive period of time, the background color of ungrouped individual items that remain ungrouped for a predetermined period of time, such as 24 hours after item creation, will change color to provide a visual indication of the delay and draw the tool 140 operator's attention to those items. Multiple background colors, each indicating a different "overdue" level, could be employed, if desired.

Drop down menu 332 allows the individual using submission tools 140 to select the name of an item organizer and review the groups created by that person. Field 330 will display the translation item groups created by the person selected in menu 332 for the text provider selected in menu 302. In this example, three group entries are shown. Each group entry has a name field 334 displaying the name of the group that was assigned by the person who created the group and an automatically assigned identifying group number 336. Each group has an associated check box 338 allowing individual groups to be selected for further action. Group entries will remain in field 330 until submitted for translation. Each group in field 330 is implemented as an expandable tree. The user can click on the + symbol 339 associated with a group to cause all translation items associated with that group to be displayed in field 330 for review.

Each individual translation item from item field 310 must be assigned to a group prior to be forwarded to translators 160 for translation processing. Under some circumstances, a group may contain only a single translation item. The selection of related items for grouping is a judgment decision by the operator of tools 140 based on the operator's understanding of the type and purpose of the content change and assessment of the most efficient manner of accomplishing the translation. Individual item entries remain in field 310 until they are grouped and the group is submitted for translation to translators 160.

Field 340 allows the operator of tools 140 to specify relevant group identifying information. In this example, the operator is provided tools to assign a name to a group, enter the name of a project that is related to the group, enter a work item identifier if more detailed internal tracking of translation work is required, and append any notes that the item organizer believes may be useful to assist the translators in translating the group. Each new group is automatically assigned an identifying group number and a new entry for the group is displayed in field 330. Similar to the visual indications mentioned above in submission tools 140, visual indications are employed to alert translators that groups of translation items waiting for translation are approaching their translation deadlines. The background color of untranslated groups will change color to provide a visual indication of approaching deadlines. Multiple background colors, each indicating a different proximity to the deadline could be employed, if desired.

Submission tools 140 displays various labeled buttons to allow the operator to create new groups and modify existing groups. Standard click-and-drag procedures are also supported in addition to the described buttons. In the situation depicted in FIG. 3, if the operation desires to create a new group comprising items 314 and 316, the operator can select "Add to New Group" button 320. In this case, selected items 314 and 316 would form a new group and a new group entry would be entered in field 330 as specified by the group information entered by the operator of tools 140 in field 340.

Alternatively, the operator may desire to add selected items 314 and 316 to an existing group. In this case, the operator can select the desired one of the existing groups in field 330, by checking the appropriate check box 338 associated with that group, and then select "Add to Selected Group" button 332.

As another option, if items in field 310 have already been associated with a group, the operator can remove items from a group by selecting a group in field 330, selecting the items in field 310 to be removed from that group, and then selecting "Remove from Selected Group" button 324. Finally, because translation item entries are automatically generated in response to any modification of text in text content 100, certain items may not actually require any translation at all. If a text edit in text content 100 were to be, for example, an individual's name, a trademark, or a filename, a translation of that text would not be required or appropriate. Items that do not require the attention of the translators can be removed from the translation workflow system by selecting those items in field 310 and then selecting "Remove Selected Items" button 326. All potential translation items, whether or not eventually translated or not, are retained for future review and analysis. Items that are identified by the user of submission tools 140 as not requiring translation and removed from field 310 can be retrieved and displayed for review purposes using radio button 308. Similarly, all groups created using submission tools 140 are also retained on an ongoing basis to allow both pre-translation review and post-translation review and analysis.

Before a group is ready to be submitted to translators 160 for translation, the operator of tools 140 will select the identifier of the U.S. release that will contain the new content in the group using drop down menu 352 and select a schedule for the translation deadlines for the group using drop down menu 354. Based on the operator's selections in menus 352 and 354, the associated translation languages, release identifier 358, release date, and translation deadline 360 for each site language 356 in field 350 is automatically filled in. In FIG. 3, a single deadline field is depicted in field 350, but multiple deadline fields could be displayed under some circumstances. Because each translation task includes a description of the particular content source of the text element in content 100, the submission tools can automatically adapt the columns in field 350 as required by the specific tasks. For example, if the translation group currently being created contains one or more translation tasks for content requiring multiple translation deadlines, field 350 will be automatically updated to display the requisite number of deadline columns or other columns required by the content type.

At this point, if the operator of tools 140 is aware of special translation circumstances that require alteration of the standard translation schedule for one or more languages, the operator can manually adjust individual schedule items in field 350 by deleting or adding one or more languages 356, changing one or more language release identifiers 358, and/or changing one or more language translation deadlines 360. Changing a release identifier will automatically cause the associated translation deadline information to be updated appropriately to reflect the new release information. The translation deadlines initially displayed are standard default determined by the schedule selected in translation schedule field 354. These default individual translation deadlines can be overridden by the submitter, if circumstances mandate a different translation deadline for one or more languages.

When a group of related translation items has been assembled, identified and scheduled for translation using tools 140, the group is ready for submission to translators 160. Some groups in field 330 may be ready to submit while other groups are still being assembled or reviewed. The group or groups to be submitted are indicated using check boxes 338. When the user clicks "Submit for Translation" button 370, the groups with checked boxes 338 are submitted. Button 370 generates a translation task notification to each translator having privileges to translate at least one of the languages 356. The submission of each group will typically result in a many separate "tasks", each task being to translate that group into a different language. Translators are notified of the new pending translation task relevant to them via a popup message on their monitors, an email message, or other desired technique.

Figure 4A:
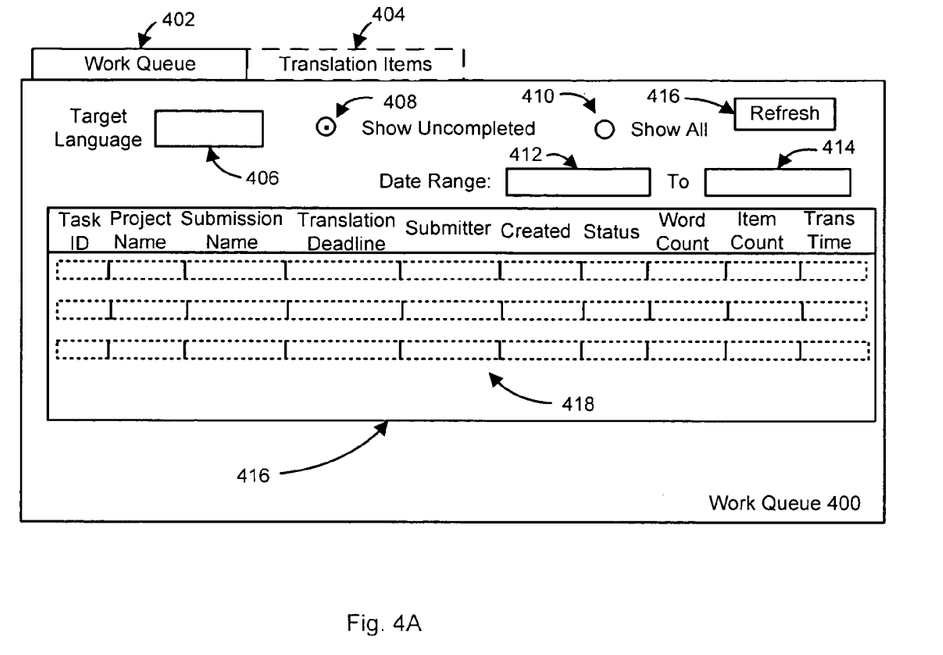
FIGS. 4A and 4B depicts an embodiment of displays for translation processing of translation groups.
Figure 4B:
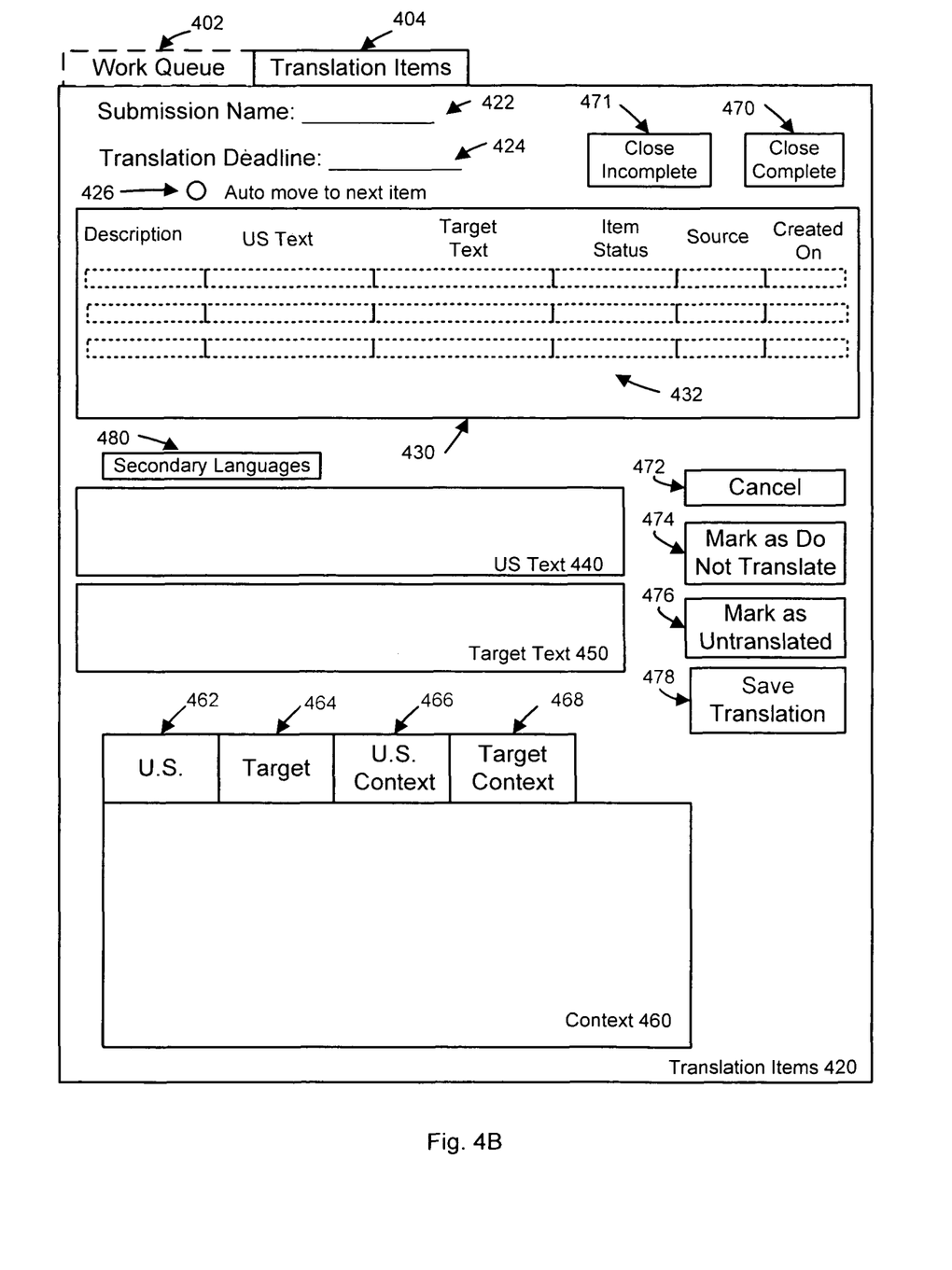

Referring now to FIGS. 4A-B, translation tools 170 will be discussed. In the disclosed embodiment, translation tools 170 comprises two displays: work queue 400 and translation items 420. When a translator is notified that there is translation work to be performed, the translator first accesses work queue 400. When opened, work queue 400 will default to the language for which the translator has been assigned translation privileges as discussed above in connection with FIG. 2B. Target language drop down menu 406 will display the name of the language. The translator can use menu 406 to change the language selection to another language for which the translator has translation privileges, if any.

Translation group entries 418 for translation groups for the target language are displayed in field 416. The translator is provided with the ability to specify a date range using date menus 412 and 414 and the ability using radio buttons 408 and 410 to view either all groups within the date range or just uncompleted translation groups. Refresh button 416 refreshes the displayed information.

Each translation group entry 418 contains the translation task identifier, project name, group name, translation deadline, the name of the individual who created the group, the group creation date, the status of the group translation, and, to assist the translator in determining the scope of the translation effort, a word count value indicating the total number of new or modified English words in the group and an item count value indicating the total number separate translation items in the group. For post-translation evaluation and review purposes, the disclosed embodiment of each translation group entry includes a translation time field, updated with an indication of the amount of time that was required to complete the translation of the group.

When the translator selects a specific group to translate, for example, by double clicking on one of the group entries 418, translation items 420 (FIG. 4B) will be displayed to the translator. The name of the group selected by the translator is displayed in field 422 and the translation deadline for the group is displayed in field 424. The individual translation task items 432 of the selected group are displayed in field 430. Each item displays a brief description of the text element, a short excerpt of the U.S. text, the translation status of that text item, the source of the text entry (website text 101, image text 102 or email text 103), and the date and time the item was created.

If the translation item was generated because of a modification to an existing text element, a few words of the target language version of the earlier existing text element are displayed in the translation item entry in the target text field. If the translation item entry was generated because a new U.S. text item was added that has no pre-existing target language translation, the target text field in the translation item entry in field 430 will by default contain the U.S. text, providing an indication to the translator that no current target language version of this text exists.

When the translator selects a specific text item entry 432 for translation, for example by single clicking on the entry, the current U.S. text item is displayed in U.S. text field 440 and the associated target language text item, if any, is displayed in target text field 450.

The selected U.S. text item is displayed in field 440 with its associated markup language tags and attributes that are required by the recipient's browser program to properly render the item for viewing by the user. To facilitate a quick and clear understanding by the translator of the context in which the text is being used and to allow the translator to verify how and where the text is going to appear, context field 460 is provided to allow the translator to view the U.S. and translated text element in the same manner as it would be seen by a user of the site. If the translator selects U.S. tab 462, the information associated with the text element in the content management system 101-103 is retrieved and displayed. This information may include comments and other context information that may be useful to the translator in eliminating possible confusion or ambiguity about how the U.S. English text should be translated. Target tab 464 will similarly cause the information associated with the translated text element from the content management system to be displayed in the target language. For further translator visualization and verification, U.S. context tab 466 will display the text element as it would appear to a user when rendered in a web browser. Similarly, target context tab 468 will display the translated target language version of the text as it would appear to when rendered in a web browser. Additional tabs providing the translator with access to additional resources, such as a dictionary, documentation about the project or change request to which the text edit relates, or other context information, could be employed, if desired.

The translation items 420 tools provide the translator with several buttons for handling translation items. Some items that the operator of tools 140 forwarded for translation may, upon subsequent review by a translator, not actually require a translation. If a translator determines that translation of a particular text element is not required, the translator may use Do Not Translate button 474 to modify the item status. As was the case with items removed in submission tools 140, items marked as do not translate are retained for future review and analysis. Mark as Untranslated button 476 is used if the translator has initiated a translation in field 450, but does not consider the translation to be finalized and wants to flag the item as still being untranslated. Cancel button 472 will delete any translation entered by the translator in field 450.

When the translator is satisfied with the translation of an item, Save Translation button 478 will flag the item as translated, save the text in field 450 to the corresponding target language content area in Text content 100, and save the translated text in translation memory 180. When all translation items in the group have been processed, close complete group button 470 will return the translator to work queue 400 (FIG. 4A). If the translator desires to close the currently open group, but the group has not yet been fully translated, the translator uses close incomplete button 471 to ensure the incomplete status of the group is properly identified.

As mentioned above, many countries share a basic common language, but different countries may have local variations in spelling, vocabulary, slang and so forth. For example, English usage differs among the U.S., the U.K., Australia and other English speaking countries. Similar situations exist, for example, between Spanish usage in Europe and in the Western hemisphere, or French usage in France and in Belgium. Translators may be responsible for being aware of and appropriately dealing with these variations. For example, the translator responsible for "translating" U.S. English into U.K. English may also be responsible for Canadian, Australian and New Zealand English variations. Because many of the translations will be similar, secondary languages menu 480 allows a translator who is responsible for multiple related translations to quickly move between similar related translation tasks, such as U.S. English to French for France and U.S. English to French for Belgium, so that related translation items can be efficiently handled at substantially the same time.

As discussed above, the system is implemented to track and retain incremental work and performance metrics for review and analysis purposes. In the disclosed embodiment, all potential translation tasks provided to potential translation items 120, whether eventually deleted or translated, are retained, all groups created using submission tools 140 are retained, and all translations created using translation tools 170 are retained. Additional metrics, such as the time spent by individuals in performing various activities is tracked and retained. This facilitates quality reviews and employee performance assessments and also facilitates improved workflow planning and scheduling by, for example, by providing data and reports allowing various types of translations to be evaluated for average translation time.

While an exemplary embodiment of the invention has been discussed, the described embodiment is to be considered as illustrative rather than restrictive. The scope of the invention is as indicated in the following claims and all equivalent methods and systems.

What is claimed is:

1. A text translation workflow system for managing translations of edits to text elements in a body of text content, the body of text content being maintained in memory containing at least a plurality of first language text elements and versions of at least some of the plurality of first language text elements translated into at least one other language, the memory being editable by a plurality of text providers, the system comprising:
   non-transitory computer readable memory storing a potential translation item queue comprising one or more translation item entries, each translation item entry corresponding to a text change made by a text provider to a first language text element in the body of text content;
   one or more adapters configured to receive text edit information corresponding to a text edit of a respective first language text element of the body of text content, the one or more adapters configured to automatically generate a corresponding translation item entry and to store the corresponding translation item entry in the potential translation item queue;
   submission tools presented on a display and providing input controls configured to allow one or more human translation item reviewers to select and review at least a portion of the translation item entries in the potential translation item queue and to allow the one or more human translation item reviewers to create one or more translation groups, each translation group comprising one or more of the reviewed translation item entries to be processed together by a single human translator; and
   translation tools presented on a display and providing input controls configured to allow one or more human translators to select a translation group for translation, select a translation item entry within the selected group, generate a translation of the edited first language text element associated with the selected translation item entry, and save the translation of the selected edited first language text element in the memory.

2. The system of claim 1 wherein the text elements in the memory include text elements from one or more of the groups comprising: text used on a web page, text embedded in images, and text used in promotional emails.

3. The system of claim 1 further comprising administration tools presented on a display and providing input controls configured to allow an administrator to assign language translation privileges to the one or more human translators.

4. The system of claim 3 wherein the translation tools display to a translator only those translation groups for a language to which the translator has been assigned language translation privileges.

5. The system of claim 1 further comprising administration tools presented on a display and providing input controls configured to allow an administrator to assign translation review privileges to the one or more human translation item reviewers.

6. The system of claim 1 wherein the submission tools are configured to allow the submission tools user to determine the languages into which a translation group must be translated and to determine a translation deadline for each such language.

7. The system of claim 6 wherein the submission tools provide input controls configured to allow the submission tools user to submit a translation group for translation and wherein the tools automatically generate a notification to one or more translators that a translation group has been submitted for translation.

8. The system of claim 1 wherein the submission tools provide input controls configured to allow the submission tools user to delete translation items that do not require translation.

9. The system of claim 1 wherein the translation tools include a translation group display area for displaying at least some of the translation group entries identifying translation groups awaiting translation.

10. The system of claim 1 wherein the at least one translation tool includes a translation item entry display area for displaying translation item entries in a translation group selected by a translator, a first language text display area for displaying in the first language the text element associated with a selected translation item from the translation item display area, and a second language display area for displaying a translation of the text element displayed in the first language text display area.

11. The system of claim 10 wherein the translation tools further include a context display field for displaying the text element in context.

12. The system of claim 1 further comprising administration tools for establishing deadlines for the completion of the review of translation groups and wherein the translation tools display at least the associated translation deadline for each translation group.

13. A method for processing text translations of a plurality of edits to text elements stored in a text element memory, the method comprising receiving by one or more adapters configured to receive text edit information corresponding to a text edit of a respective first language text element of the body of text content, for each text element edit, automatically generating by the one or more adapters a corresponding translation item requiring translation review by a human translator and storing the translation item in a queue of potential translation items, providing a reviewer user interface on a display which comprises user input controls configured to allow one or more human reviewers to select and review one or more translation items in the queue and to select related translation items in the queue, to group the selected items into a translation group for translation by a single translator into at least one other language, and to submit the translation group for translation, providing a translation user interface on a display which comprises user input controls configured to allow one or more human translators to select a submitted translation group, to select a pending translation item from the selected translation group, to generate a translation of the text item associated with the selected translation item from a first language into at least one other language, and to store the generated translation of the text item in the text element memory.

14. The method of claim 13 wherein the reviewer user interface further comprises user input controls configured to allow the one or more human reviewers to delete translation items that do not require translation.

15. The method of claim 14 wherein selection of a translation group by a respective one of the one or more human translators operates to assign the translation group to the respective human translator such that all of the translation items in the selected translation group are to be translated by the respective human translator.

16. One or more computer readable media having computer executable instructions encoded thereon for performing the method of claim 14.

* * * * *